(12) United States Patent
Kishimoto

(10) Patent No.: US 12,422,323 B2
(45) Date of Patent: Sep. 23, 2025

(54) PROTECTION STRUCTURE FOR PRESSURE SENSOR DEVICE

(71) Applicant: Mitsubishi Electric Corporation, Tokyo (JP)

(72) Inventor: Hiroyuki Kishimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 194 days.

(21) Appl. No.: 18/268,121

(22) PCT Filed: Feb. 25, 2021

(86) PCT No.: PCT/JP2021/007026
§ 371 (c)(1),
(2) Date: Jun. 16, 2023

(87) PCT Pub. No.: WO2022/180728
PCT Pub. Date: Sep. 1, 2022

(65) Prior Publication Data
US 2024/0295456 A1     Sep. 5, 2024

(51) Int. Cl.
*G01L 9/00* (2006.01)
*G01L 19/06* (2006.01)

(52) U.S. Cl.
CPC .......... *G01L 19/0627* (2013.01); *G01L 9/008* (2013.01)

(58) Field of Classification Search
CPC . G01L 19/147; G01L 9/0072; G01L 19/0645; G01L 19/0084; G01L 13/025; G01L 19/0007; G01L 9/0042; G01L 19/0038; G01L 9/0073; G01L 9/0075; G01L 9/0054; G01L 9/0055; G01L 19/04; G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/12; G01L 9/065; G01L 19/0618;
(Continued)

(56) References Cited

U.S. PATENT DOCUMENTS 11,137,307 B2 * 10/2021 Tushima ................. G01L 19/04
2020/0132553 A1    4/2020 Kishimoto

FOREIGN PATENT DOCUMENTS

DE      10046017 A1 *  4/2001  .......... G01L 19/141
DE      19950538 B4 *  5/2008  .......... G01L 19/147
(Continued)

*Primary Examiner* — Andre J Allen
(74) *Attorney, Agent, or Firm* — Sughrue Mion, PLLC

(57) ABSTRACT

Provided is a pressure sensor device including: a case body; a pressure detection element; a wire; and a lead frame, wherein the case body has a first recessed portion and a second recessed portion formed therein, wherein the first recessed portion faces a pressure introduction chamber, wherein the second recessed portion is formed in a part of a bottom portion of the first recessed portion, wherein at least a part of the lead frame, the pressure detection element, and the wire are arranged inside of the second recessed portion, wherein the second recessed portion is filled with a first protection member, wherein the first recessed portion has a resin member having a film shape provided therein, wherein the resin member covers an entire surface of the first protection member, wherein the first recessed portion is filled with a second protection member.

6 Claims, 1 Drawing Sheet

(58) Field of Classification Search
CPC ......... G01L 9/0052; G01L 9/125; G01L 7/16; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 13/026; G01L 11/008; G01L 7/22; G01L 13/00; G01L 9/0047; G01L 7/08; G01L 9/0076; G01L 9/0025; G01L 9/0035; G01L 19/0061; G01L 9/0005; G01L 9/0041; G01L 9/0019; G01L 9/08; G01L 9/10; G01L 21/00; G01L 9/04; G01L 11/006; G01L 19/086; G01L 9/00; G01L 9/0008; G01L 1/18; G01L 11/004; G01L 19/069; G01L 9/0057; G01L 19/083; G01L 19/06; G01L 19/10; G01L 19/16; G01L 9/0016; G01L 13/023; G01L 7/048; G01L 9/0048; G01L 9/0027; G01L 9/0086; G01L 9/0079; G01L 11/04; G01L 1/20; G01L 9/0091; G01L 27/00; G01L 11/002; G01L 23/24; G01L 7/182; G01L 1/02; G01L 19/00663; G01L 7/166; G01L 23/22; G01L 9/0036; G01L 9/0061; G01L 9/0039; G01L 23/125; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 13/06; G01L 23/16; G01L 7/088; G01L 7/163; G01L 9/0007; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 5/228; G01L 7/06; G01L 1/2206; G01L 7/102; G01L 13/021; G01L 27/02; G01L 1/2262; G01L 1/24; G01L 1/26; G01L 23/00; G01L 9/0094; G01L 19/144; G01L 9/0082; G01L 1/125; G01L 9/0097; G01L 1/2268; G01L 11/06; G01L 21/30; G01L 21/34; G01L 23/221; G01L 7/187; G01L 7/20; G01L 1/146; G01L 23/26; G01L 7/068; G01L 1/144; G01L 1/225; G01L 23/32; G01L 7/14; G01L 1/165; G01L 23/12; G01L 1/241; G01L 13/04; G01L 7/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/04; G01L 1/242; G01L 21/24; G01L 3/10; G01L 5/0004; G01L 5/0052; G01L 5/24; G01L 7/10; G01L 1/00; G01L 1/103; G01L 1/2275; G01L 1/247; G01L 21/02; G01L 21/26; G01L 23/225; G01L 3/102; G01L 3/105; G01L 5/2223; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/1627; G01L 5/166; G01L 7/185; G01L 1/255; G01L 21/08; G01L 5/0057; G01L 5/22; G01L 1/042; G01L 1/122; G01L 1/2225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106

USPC ..................................................... 73/700–756

See application file for complete search history.

(56) References Cited

FOREIGN PATENT DOCUMENTS

| | | | | |
|---|---|---|---|---|
| DE | 10157402 B4 | * | 8/2011 | ......... G01L 19/0038 |
| FR | 2872903 A1 | * | 1/2006 | ......... G01L 19/0038 |
| JP | 2009052970 A | * | 3/2009 | |
| JP | 5884921 B2 | * | 3/2016 | ......... G01L 19/0069 |
| JP | 2017187383 A | * | 10/2017 | ............... G01K 1/10 |
| JP | 6656336 B1 | | 3/2020 | |

* cited by examiner

PROTECTION STRUCTURE FOR PRESSURE SENSOR DEVICE

CROSS REFERENCE TO RELATED APPLICATIONS

This application is a National Stage of International Application No. PCT/JP2021/007026 filed on Feb. 25, 2021.

TECHNICAL FIELD

This disclosure relates to a pressure sensor device including a pressure detection element for detecting a pressure of a measurement medium.

BACKGROUND ART

In Patent Literature 1, there is described a temperature sensor device of a pressure-sensor-combined type. This temperature sensor device of a pressure-sensor-combined type includes a housing, a pressure sensor module and a temperature sensor module which are provided inside of the housing, and a case in which a pressure introduction passage is formed. The pressure sensor module includes a pressure detection element, a wire, and a lead frame. The pressure detection element detects a pressure of intake air introduced through the pressure introduction passage. The lead frame is connected to the pressure detection element via the wire. Inside of the housing, the pressure detection element, the wire, and the lead frame are covered with a protection member made from fluorine gel or fluorosilicone gel.

CITATION LIST

Patent Literature

[PTL 1] JP 6656336 B1

SUMMARY OF INVENTION

Technical Problem

However, depending on a usage environment of the pressure sensor, a corrosive substance may permeate into the above-mentioned protection member. Accordingly, in some cases, the pressure detection element, the wire, and the lead frame cannot be sufficiently protected. When the corrosive substance permeates into the above-mentioned protection member so that corrosion is caused at a joining portion between the pressure detection element and the wire, a joining portion between the wire and the lead frame, or the like, accurate pressure detection is difficult. Thus, the related-art pressure sensor has a problem in that, in some cases, reliability is reduced depending on the usage environment.

This disclosure has been made to solve the above-mentioned problem, and has an object to provide a pressure sensor device capable of further improving the reliability.

Solution to Problem

According to one embodiment of this disclosure, there is provided a pressure sensor device including: a case body having a pressure introduction chamber formed therein; a pressure detection element configured to detect a pressure of a measurement medium introduced to the pressure introduction chamber; a wire; and a lead frame electrically connected to the pressure detection element via the wire, wherein the case body has a first recessed portion and a second recessed portion formed therein, wherein the first recessed portion faces the pressure introduction chamber, wherein the second recessed portion is formed in a part of a bottom portion of the first recessed portion, wherein at least a part of the lead frame, the pressure detection element, and the wire are arranged inside of the second recessed portion, wherein the second recessed portion is filled with a first protection member, wherein the first recessed portion has a resin member having a film shape provided therein, wherein the resin member covers an entire surface of the first protection member, and is in close contact with the first protection member, wherein the first recessed portion is filled with a second protection member, and wherein the second protection member is in close contact with the resin member.

Advantageous Effects of Invention

According to this disclosure, the reliability of the pressure sensor device can be further improved.

DESCRIPTION OF EMBODIMENTS

First Embodiment

Figure 1:
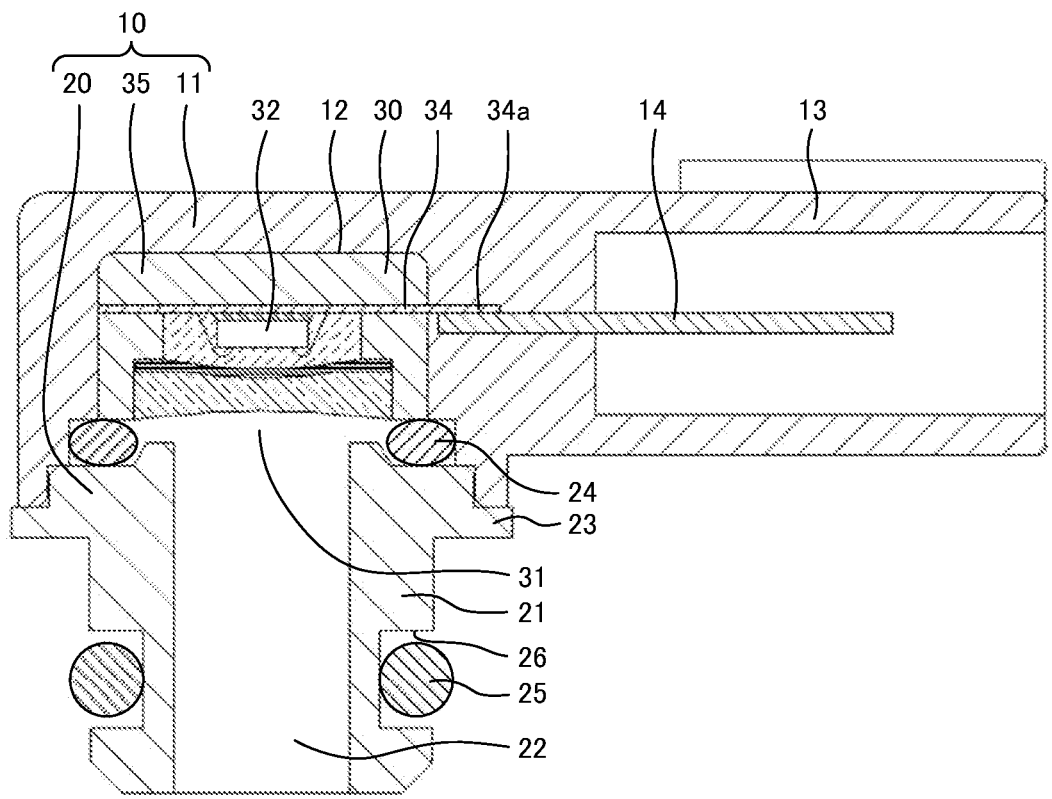
FIG. 1 is a cross-sectional view for illustrating a configuration of a pressure sensor device according to a first embodiment of this disclosure.

A pressure sensor device according to a first embodiment of this disclosure is described. FIG. 1 is a cross-sectional view for illustrating a configuration of the pressure sensor device according to this embodiment. In this embodiment, as the pressure sensor device, there is exemplified an intake pressure sensor which is to be mounted to an intake manifold of a vehicle, and is to be used under an environment of being exposed to organic solvents such as gasoline or oils such as an engine oil.

As illustrated in FIG. 1, the pressure sensor device includes a housing 11, a case 20, and a pressure sensor module 30 stored in the housing 11. The housing 11 and the case 20 form, together with a resin package 35 to be described later, a case body 10 of the pressure sensor device. The housing 11 and the case 20 are both made of a thermoplastic resin. As the thermoplastic resin, a polybutylene terephthalate resin (PBT resin), a polyphenylene sulfide resin (PPS resin), or the like can be used.

The housing 11 includes a storage portion 12 for storing the pressure sensor module 30, and a connector 13 provided on a lateral side of the storage portion 12. Inside of the connector 13, an external connection terminal 14 connected to the pressure sensor module 30 is provided. The external connection terminal 14 is to be electrically connected to an external signal processing circuit such as a vehicle control unit. Through insert molding, the housing 11 is integrated with the external connection terminal 14, the pressure sensor module 30, and the like.

The case 20 is arranged so as to be opposed to the housing 11 across the pressure sensor module 30. Inside of the case body 10, a pressure introduction chamber 31 is formed between the case 20 and the pressure sensor module 30.

The case 20 includes a columnar portion 21 to be inserted into a mounting hole (not shown) formed in the intake manifold. Inside of the columnar portion 21, a pressure introduction passage 22 for introducing intake air serving as a measurement medium to the pressure introduction chamber 31 is formed.

In the columnar portion 21, a flange portion 23 projecting to an outer peripheral side is formed. The flange portion 23 is welded or bonded to the housing 11 over the entire circumference. On an inner peripheral side with respect to the flange portion 23 and on the outer peripheral side with respect to the pressure introduction passage 22, an O-ring 24 is provided. The O-ring 24 is in close contact with both of the case 20 and the resin package 35 to be described later so that airtightness is ensured between the case 20 and the pressure sensor module 30. In this manner, the intake air introduced to the pressure introduction chamber 31 through the pressure introduction passage 22 is prevented from leaking outside from a joint between the case 20 and the pressure sensor module 30.

On an outer peripheral surface of the columnar portion 21, a groove portion 26 extending in a circumferential direction is formed so as to mount an O-ring 25. When the columnar portion 21 is inserted into the mounting hole of the intake manifold, the O-ring 25 ensures the airtightness between the outer peripheral surface of the columnar portion 21 and an inner peripheral surface of the mounting hole.

Figure 2:
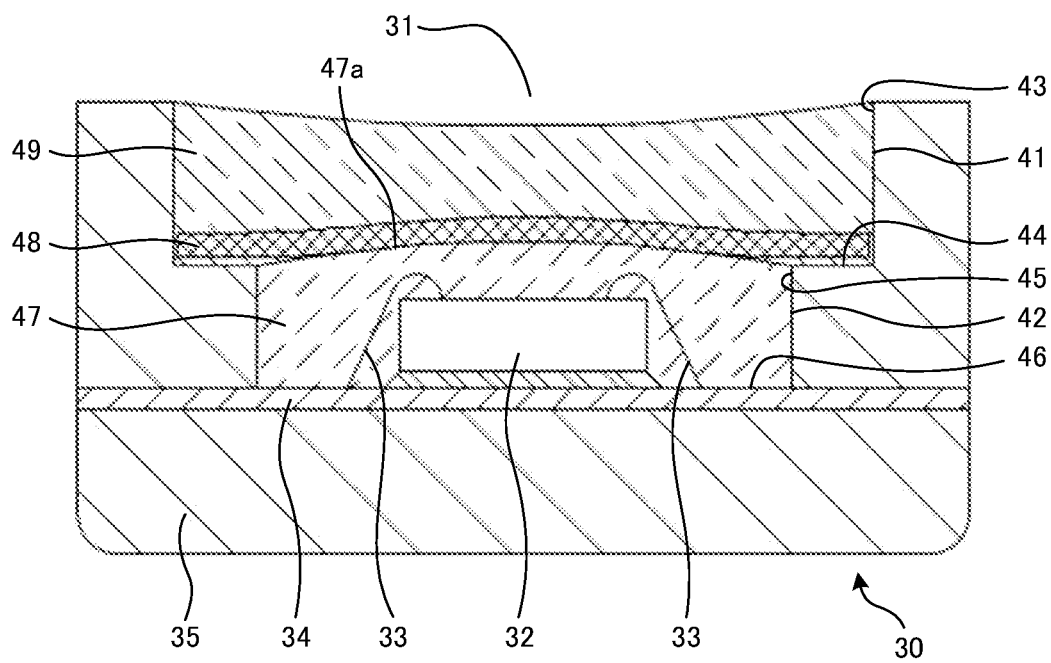
FIG. 2 is a cross-sectional view for illustrating a configuration of a pressure sensor module of the pressure sensor device according to the first embodiment.

FIG. 2 is a cross-sectional view for illustrating the configuration of the pressure sensor module of the pressure sensor device according to this embodiment. The up-down direction of FIG. 2 is inverted from the up-down direction of FIG. 1. As illustrated in FIG. 2, the pressure sensor module 30 includes a pressure detection element 32, a plurality of wires 33, a lead frame 34, and the resin package 35 for holding the pressure detection element 32 and the lead frame 34.

Each of the plurality of wires 33 is a conductive wire made of gold or aluminum. The lead frame 34 is electrically connected to the pressure detection element 32 via each wire 33. The lead frame 34 is buried in the resin package 35. As illustrated in FIG. 1, an end portion 34a of the lead frame 34 projects to the outside of the resin package 35. The end portion 34a is connected to the external connection terminal 14 through welding or soldering. In this manner, the lead frame 34 is electrically connected to the external connection terminal 14.

As the pressure detection element 32, there is used a silicon semiconductor element including a vacuum chamber and a diaphragm using a piezoresistive effect. In the diaphragm, an electrical circuit including a gauge resistor is formed. When the diaphragm is deformed by the pressure of the intake air, a resistance value of the gauge resistor changes in accordance with a deformation amount of the diaphragm. In this manner, the pressure of the intake air can be detected as a change of the resistance value. The change of the resistance value of the gauge resistor is converted into an electrical signal so as to be amplified. The amplified electrical signal is output via the external connection terminal 14 to a signal processing circuit provided outside of the pressure sensor device.

In this embodiment, a semiconductor element using the piezoresistive effect is used as the pressure detection element 32, but this disclosure is not limited thereto. The pressure detection element 32 may be an element employing a system of detecting a change of a capacitance or the like.

The resin package 35 forms, together with the housing 11 and the case 20, the case body 10 of the pressure sensor device. The resin package 35 is made of a thermosetting resin such as an epoxy resin.

The resin package 35 has a first recessed portion 41 and a second recessed portion 42 formed therein. The first recessed portion 41 faces the pressure introduction chamber 31. The first recessed portion 41 includes a first opening portion 43 and a first bottom portion 44. The first recessed portion 41 has the first opening portion 43 formed toward the pressure introduction chamber 31. The second recessed portion 42 is formed in a part of the first bottom portion 44 of the first recessed portion 41. The second recessed portion 42 includes a second opening portion 45 and a second bottom portion 46. The second recessed portion 42 has the second opening portion 45 formed toward a space in the first recessed portion 41. The second bottom portion 46 is formed so that a part of the lead frame 34 buried in the resin package 35 is exposed. The second opening portion 45 is opened so as to be smaller than the first opening portion 43. That is, an opening area of the second opening portion 45 is smaller than an opening area of the first opening portion 43. The first bottom portion 44 of the first recessed portion 41 is formed into an annular shape so as to surround the second opening portion 45 of the second recessed portion 42.

At least a part of the lead frame 34, the pressure detection element 32, and the wires 33 are arranged inside of the second recessed portion 42. In this manner, a connection portion between the pressure detection element 32 and each wire 33 and a connection portion between each wire 33 and the lead frame 34 are arranged inside of the second recessed portion 42.

The second recessed portion 42 is filled with a first protection member 47. The first protection member 47 fills the entire second recessed portion 42. That is, the first protection member 47 is loaded from the second bottom portion 46 to the second opening portion 45 in a depth direction of the second recessed portion 42. A surface 47a of the first protection member 47 is formed into a curved surface shape, for example, a dome shape, that is convex toward the pressure introduction chamber 31 side. As viewed from the pressure introduction chamber 31 side, the shape of an outer edge of the surface 47a matches the shape of the second opening portion 45 of the second recessed portion 42. The first protection member 47 covers the pressure detection element 32, the wires 33, and the lead frame 34 inside of the second recessed portion 42. The first protection member 47 is in close contact with the pressure detection element 32, the wires 33, and the lead frame 34. In this manner, the pressure detection element 32, the wires 33, and the lead frame 34 are protected by the first protection member 47. Further, the first protection member 47 is also in close contact with the resin package 35 of the pressure sensor module 30.

The first protection member 47 is made of a gel having an electrical insulating property. A gel has an intermediate property of a solid and liquid. Accordingly, the first protection member 47 can protect the pressure detection element 32, the wires 33, and the lead frame 34, and can also transmit the pressure of the measurement medium in the pressure introduction chamber 31 to the pressure detection element 32.

The first protection member 47 in this embodiment is made of a fluorine-based gel. The fluorine-based gel has a property of being resistant to any of organic solvents such as gasoline, oils such as an engine oil, and condensate water containing corrosive substances such as nitrate ion. In the following description, in some cases, the organic solvents, oils, and condensate water containing corrosive substances are collectively referred to as "liquid containing corrosive substances." When the first protection member 47 is made of a fluorine-based gel, resistance of the first protection member 47 against the liquid containing corrosive substances can be enhanced.

In the first recessed portion 41, a film-shaped resin member 48 is provided. The resin member 48 has an outer shape that is larger than that of the second opening portion 45 of the second recessed portion 42. The resin member 48 covers the entire surface 47a of the first protection member 47, and is in close contact with the first protection member 47. As viewed from the pressure introduction chamber 31 side, the resin member 48 covers the pressure detection element 32, the wires 33, and the lead frame 34. The resin member 48 is opposed to the pressure detection element 32 across the first protection member 47. Further, as viewed from the pressure introduction chamber 31 side, the resin member 48 overlaps the first bottom portion 44 formed into the annular shape over the entire circumference.

The resin member 48 is made of a porous material. The resin member 48 has a thickness of from about 0.3 mm to about 0.4 mm. The resin member 48 has flexibility and also has required mechanical strength. The flexibility of the resin member 48 is maintained independent of temperature.

In this case, when an air layer such as air bubbles is formed between the resin member 48 and the first protection member 47, volume expansion or volume contraction of the air layer is caused by a temperature change, and the volume expansion or the volume contraction of the air layer is transmitted to the pressure detection element 32 via the first protection member 47. As described above, the volume expansion or the volume contraction of the air layer is an unintended error component in pressure detection. Accordingly, in order to detect an accurate pressure, it is desired that the air layer be prevented from being formed between the resin member 48 and the first protection member 47.

If the surface 47a of the first protection member 47 is formed into a concave curved surface shape, it is difficult to bring the resin member 48 and the first protection member 47 into close contact with each other without interposing the air layer therebetween. In contrast, in this embodiment, the surface 47a of the first protection member 47 is formed into a curved surface shape that is convex toward the pressure introduction chamber 31 side, and hence the resin member 48 and the first protection member 47 can be easily brought into close contact with each other without interposing the air layer therebetween.

The resin member 48 is made of a porous material, for example, a continuous porous material including continuous pore structures. Accordingly, the resin member 48 has air permeability. That is, the resin member 48 allows gases, such as air and water vapor, to pass therethrough. In this manner, when the first protection member 47 is cured into a gel form during a process of manufacturing the pressure sensor device, an increase of an internal pressure of the first protection member 47 caused along with the temperature increase can be relaxed. Further, the first protection member 47 can be cured without losing the shape of the first protection member 47.

Further, when the temperature is increased to cure the first protection member 47, in some cases, water vapor is generated from the first protection member 47. The resin member 48 allows the generated water vapor to pass therethrough, and hence formation of the air layer between the resin member 48 and the first protection member 47 can be suppressed.

The resin member 48 has water repellency and oil repellency. Accordingly, the resin member 48 can repel the liquid containing corrosive substances. In this manner, the resin member 48 can be more reliably prevented from being affected by the liquid containing corrosive substances.

The resin member 48 in this embodiment is made of polytetrafluoroethylene (PTFE), which is one type of fluorine-based resins and is chemically inactive. However, the resin member 48 may be made of other fluorine-based resins such as tetrafluoroethylene-perfluoroalkylvinylether copolymer (PFA).

The first recessed portion 41 is filled with a second protection member 49. The second protection member 49 covers the entire resin member 48, and is in close contact with the resin member 48. The second protection member 49 faces the pressure introduction chamber 31.

During the process of manufacturing the pressure sensor device and in a usage environment of the pressure sensor device after the pressure sensor device is mounted to a vehicle, there is a possibility that the film-shaped resin member 48 is torn or damaged. One role of the second protection member 49 is to protect the resin member 48 so that the resin member 48 is prevented from being torn or damaged, to thereby maintain the function of the resin member 48.

The second protection member 49 is in close contact with, not only the resin member 48, but also the first protection member 47 and the resin package 35. The resin member 48 is covered with the first protection member 47 and the second protection member 49 over the entire circumference.

The second protection member 49 is made of a gel. Accordingly, the second protection member 49 can protect the resin member 48, and can also transmit the pressure of the measurement medium in the pressure introduction chamber 31 to the resin member 48.

Similarly to the first protection member 47, the second protection member 49 in this embodiment is made of a fluorine-based gel. In this manner, the resistance of the second protection member 49 against the liquid containing corrosive substances can be enhanced.

As described above, a protection member for protecting the pressure detection element 32, the wires 33, and the lead frame 34 has a laminated structure in which the first protection member 47, the resin member 48, and the second protection member 49 are laminated in the stated order from the pressure detection element 32 side. The resin member 48 is positioned in an intermediate layer between the first protection member 47 and the second protection member 49.

Each of the first protection member 47 and the second protection member 49 is made of a gel. The resin member 48 is formed into a film shape. Accordingly, the pressure of the measurement medium in the pressure introduction chamber 31 is transmitted to the pressure detection element 32 via the second protection member 49, the resin member 48, and the first protection member 47. That is, in this embodiment, without sacrificing the detection accuracy of the pressure sensor device, the pressure detection element 32, the wires 33, and the lead frame 34 can be protected through use of the laminated structure of the first protection member 47, the resin member 48, and the second protection member 49.

It is assumed that, in the pressure sensor device having the configuration described above, the liquid containing corrosive substances enters the pressure introduction chamber 31 via the pressure introduction passage 22. This liquid has a possibility of permeating into the second protection member 49 from the surface of the second protection member 49. However, the resin member 48 provided between the second protection member 49 and the first protection member 47 functions as a stopper for preventing entrance of the liquid. Accordingly, permeation of the liquid containing corrosive substances into the first protection member 47 can be suppressed. Thus, according to this embodiment, the pressure detection element 32, the wires 33, and the lead frame 34 can be protected from the corrosive substance.

The entrance of the liquid into the first protection member 47 is prevented by the resin member 48. In this manner, the liquid permeating into the second protection member 49 is absorbed by the second protection member 49. There is a possibility that alteration such as swelling is caused in the second protection member 49 absorbing the liquid, thereby causing a stress. However, the resin member 48 provided between the second protection member 49 and the first protection member 47 functions as a cushioning member for suppressing transmission of the stress caused in the second protection member 49 to the first protection member 47. Accordingly, transmission of the stress caused by the alteration of the second protection member 49 to the pressure detection element 32 can be suppressed.

As described above, the pressure sensor device according to this embodiment includes the housing 11, the case 20, the resin package 35, the pressure detection element 32, the wire 33, and the lead frame 34. The housing 11, the case 20, and the resin package 35 correspond to the case body 10 having the pressure introduction chamber 31 formed therein. The pressure detection element 32 is configured to detect the pressure of the measurement medium introduced to the pressure introduction chamber 31. The lead frame 34 is electrically connected to the pressure detection element 32 via the wire 33. The resin package 35 has the first recessed portion 41 and the second recessed portion 42 formed therein. The first recessed portion 41 faces the pressure introduction chamber 31. The second recessed portion 42 is formed in a part of the first bottom portion 44 of the first recessed portion 41. At least a part of the lead frame 34, the pressure detection element 32, and the wire 33 are arranged inside of the second recessed portion 42. The second recessed portion 42 is filled with the first protection member 47. The first recessed portion 41 has the resin member 48 having a film shape provided therein. The resin member 48 covers the entire surface 47a of the first protection member 47, and is in close contact with the first protection member 47. The first recessed portion 41 is filled with the second protection member 49. The second protection member 49 is in close contact with the resin member 48.

With this configuration, even when the liquid containing corrosive substances permeates into the second protection member 49, entrance of the liquid into the first protection member 47 can be suppressed by the resin member 48. Accordingly, the pressure detection element 32, the wire 33, and the lead frame 34 can be protected from the corrosive substance. In this manner, occurrence of corrosion at a joining portion between the pressure detection element 32 and the wire 33, a joining portion between the wire 33 and the lead frame 34, and the like can be suppressed, and hence accurate pressure detection can be performed for a long period of time. Thus, with the above-mentioned configuration, the reliability of the pressure sensor device can be further improved.

Further, in the above-mentioned configuration, the resin member 48 covers the entire surface 47a of the first protection member 47, and hence the liquid permeating into the second protection member 49 can be prevented from entering the first protection member 47 without passing through the resin member 48. Further, in the above-mentioned configuration, the resin member 48 is in close contact with the first protection member 47, and the second protection member 49 is in close contact with the resin member 48. Accordingly, more accurate pressure detection can be performed, and the resin member 48 can be prevented from being torn or damaged.

In the pressure sensor device according to this embodiment, the surface 47a of the first protection member 47 is formed into a curved surface shape that is convex toward the pressure introduction chamber 31 side. With this configuration, during the process of manufacturing the pressure sensor device, formation of the air layer between the first protection member 47 and the resin member 48 can be suppressed. Accordingly, with the above-mentioned configuration, more accurate pressure detection can be performed.

In the pressure sensor device according to this embodiment, the resin member 48 has water repellency and oil repellency. With this configuration, the resin member 48 can repel the liquid containing corrosive substances, and hence entrance of this liquid into the first protection member 47 can be more reliably suppressed.

In the pressure sensor device according to this embodiment, the resin member 48 is made of a porous material. With this configuration, the water vapor generated in the first protection member 47 can pass through the resin member 48. Accordingly, the increase of the internal pressure of the first protection member 47 can be prevented, and the formation of the air layer between the first protection member 47 and the resin member 48 can be prevented.

In the pressure sensor device according to this embodiment, the resin member 48 is made of a fluorine-based resin. With this configuration, the resistance of the resin member 48 against the liquid containing corrosive substances can be enhanced.

In the pressure sensor device according to this embodiment, each of the first protection member 47 and the second protection member 49 is made of a fluorine-based gel. With this configuration, the resistance of each of the first protection member 47 and the second protection member 49 against the liquid containing corrosive substances can be enhanced.

In the above-mentioned embodiment, as the pressure sensor device, an intake pressure sensor to be mounted to an intake manifold of an internal combustion engine is given as an example, but this disclosure is not limited thereto. The pressure sensor device is also applicable to uses for detecting a pressure of exhaust gas of the internal combustion engine in an EGR system.

Reference Signs List 10 case body, 11 housing, 12 storage portion, 13 connector, 14 external connection terminal, 20 case, 21 columnar portion, 22 pressure introduction passage, 23 flange portion, 24, 25 O-ring, 26 groove portion, 30 pressure sensor module, 31 pressure introduction chamber, 32 pressure detection element, 33 wire, 34 lead frame, 34a end portion, 35 resin package, 41 first recessed portion, 42 second recessed portion, 43 first opening portion, 44 first bottom portion (bottom portion), 45 second opening portion, 46 second bottom portion, 47 first protection member, 47a surface, 48 resin member, 49 second protection member

The invention claimed is:

1. A pressure sensor device, comprising:
a case body having a pressure introduction chamber formed therein;
a pressure detection element configured to detect a pressure of a measurement medium introduced to the pressure introduction chamber;
a wire; and
a lead frame electrically connected to the pressure detection element via the wire,
wherein the case body has a first recessed portion and a second recessed portion formed therein,
wherein the first recessed portion faces the pressure introduction chamber,
wherein the second recessed portion is formed in a part of a bottom portion of the first recessed portion,
wherein at least a part of the lead frame, the pressure detection element, and the wire are arranged inside of the second recessed portion,
wherein the second recessed portion is filled with a first protection member,
wherein the first recessed portion has a resin member having a film shape provided therein,
wherein the resin member covers an entire surface of the first protection member, and is in close contact with the first protection member,
wherein the first recessed portion is filled with a second protection member, and
wherein the second protection member is in close contact with the resin member.

2. The pressure sensor device according to claim 1, wherein the surface of the first protection member is formed into a curved surface shape that is convex toward the pressure introduction chamber side.

3. The pressure sensor device according to claim 1, wherein the resin member has water repellency and oil repellency.

4. The pressure sensor device according to claim 1, wherein the resin member is made of a porous material.

5. The pressure sensor device according to claim 1, wherein the resin member is made of a fluorine-based resin.

6. The pressure sensor device according to claim 1, wherein each of the first protection member and the second protection member is made of a fluorine-based gel.

* * * * *